US012743362B2

(12) United States Patent
Gupta et al.

(10) Patent No.: US 12,743,362 B2
(45) Date of Patent: Sep. 22, 2026

(54) DETERMINING LOG TEMPLATES OF A COMPUTING DEVICE FOR LOG TEMPLATIZATION

(71) Applicant: International Business Machines Corporation, Armonk, NY (US)

(72) Inventors: Pranjal Gupta, Bhilai (IN); Karan Bhukar, Jaipur (IN); Harshit Kumar, Delhi (IN); Mudit Verma, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/788,114

(22) Filed: Jul. 29, 2024

(65) Prior Publication Data

US 2026/0030134 A1 Jan. 29, 2026

(51) Int. Cl.

*G06F 17/00* (2019.01)
*G06F 11/30* (2006.01)
*G06F 11/34* (2006.01)

(52) U.S. Cl.

CPC ...... *G06F 11/3476* (2013.01); *G06F 11/3072* (2013.01)

(58) Field of Classification Search

CPC ......................... G06F 11/3476; G06F 11/3072
See application file for complete search history.

(56) References Cited

U.S. PATENT DOCUMENTS 10,452,491 B2 10/2019 Namburi
10,740,170 B2 8/2020 Debnath et al.
11,243,834 B1 * 2/2022 Mandal ................. G06F 11/079
11,307,915 B1 * 4/2022 Shwartz ................ H04L 43/091
11,366,712 B1 6/2022 Srivatsa et al.
11,411,811 B2 * 8/2022 Paradkar ............. H04L 41/0677
2021/0349895 A1 11/2021 Wang et al.

(Continued)

FOREIGN PATENT DOCUMENTS

CN 112560407 A 3/2021
CN 109325009 B 11/2021

(Continued)

OTHER PUBLICATIONS

Cheng et al. "LogAI: A Library for Log Analytics and Intelligence", arXiv:2301.13415 Jan. 31, 2023, 17 pages.

(Continued)

*Primary Examiner* — Greta L Robinson
(74) *Attorney, Agent, or Firm* — Onyx IP Group

(57) ABSTRACT

In some implementations, a computing device may obtain a set of log lines associated with operations performed at a computing device. The computing device may select a first sample of the set of log lines. The computing device may identify a first set of log templates from the first sample, the first set of log templates having a first quantity of log templates. The computing device may select a second sample of the set of log lines. The computing device may identify a second set of log templates from the second sample, the second set of log templates having a second quantity of log templates. The computing device may apply the first set of log templates to the set of log lines for log templatization based at least in part on the first quantity of log templates being equal to the second quantity of log templates.

20 Claims, 13 Drawing Sheets

(56) References Cited

U.S. PATENT DOCUMENTS

2023/0177027 A1* 6/2023 Bansal .................. G06N 20/00
707/690
2023/0236922 A1* 7/2023 Nagar ................ G06F 11/3419
714/48

FOREIGN PATENT DOCUMENTS

CN 107660283 B 12/2021
EP 3846048 A1 7/2021

OTHER PUBLICATIONS

Disclosed Anonymously, IP.com No. IPCOM000265628D "A Method and System for Log Parsing with Contextualized Embeddings in Cloud Microservices", Apr. 30, 2021, 5 pages.
Fu et al. "Execution Anomaly Detection in Distributed Systems through Unstructured Log Analysis", IEEE, 2009, 10 pages.
Gainaru et al. "Event Log Mining Tool for Large Scale HPC Systems", Euro-Par 2011 Parallel Processing, 2011, pp. 52-64.
He et al. "Identifying Impactful Service System Problems Via Log Analysis", ESEC/FSE 2018: Proceedings of the 2018 26th ACM Joint Meeting on European Software Engineering Conference and Symposium on the Foundations of Software Engineering, Oct. 26, 2018, pp. 60-70, https://doi.org/10.1145/3236024.323608.
Meng et al. "LogParse: Making Log Parsing Adaptive through Word Classification", 2020 29th International Conference on Computer Communications and Networks (ICCCN), 2020, 9 pages.

* cited by examiner

100

115B
Generate the first set of log templates

[Common field 1A] {Var. field} [Common field 1B] {Var. field}
[Common field 4A] {Var. field} [Common field 4B] {Var. field}
[Common field 3A] {Var. field} [Common field 3B] {Var. field}
[Common field 2A] {Var. field} [Common field 2B] {Var. field}

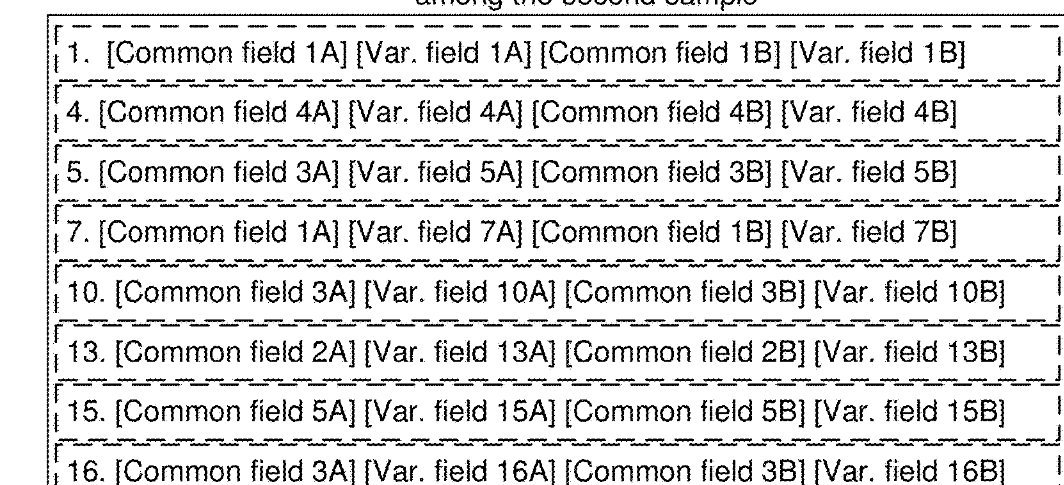

125A
Identify common fields among the second sample

1. [Common field 1A] [Var. field 1A] [Common field 1B] [Var. field 1B]
4. [Common field 4A] [Var. field 4A] [Common field 4B] [Var. field 4B]
5. [Common field 3A] [Var. field 5A] [Common field 3B] [Var. field 5B]
7. [Common field 1A] [Var. field 7A] [Common field 1B] [Var. field 7B]
10. [Common field 3A] [Var. field 10A] [Common field 3B] [Var. field 10B]
13. [Common field 2A] [Var. field 13A] [Common field 2B] [Var. field 13B]
15. [Common field 5A] [Var. field 15A] [Common field 5B] [Var. field 15B]
16. [Common field 3A] [Var. field 16A] [Common field 3B] [Var. field 16B]

125B
Generate the second set of log templates

[Common field 1A] {Var. field} [Common field 1B] {Var. field}
[Common field 4A] {Var. field} [Common field 4B] {Var. field}
[Common field 3A] {Var. field} [Common field 3B] {Var. field}
[Common field 2A] {Var. field} [Common field 2B] {Var. field}
[Common field 5A] {Var. field} [Common field 5B] {Var. field}

Figure 1G:
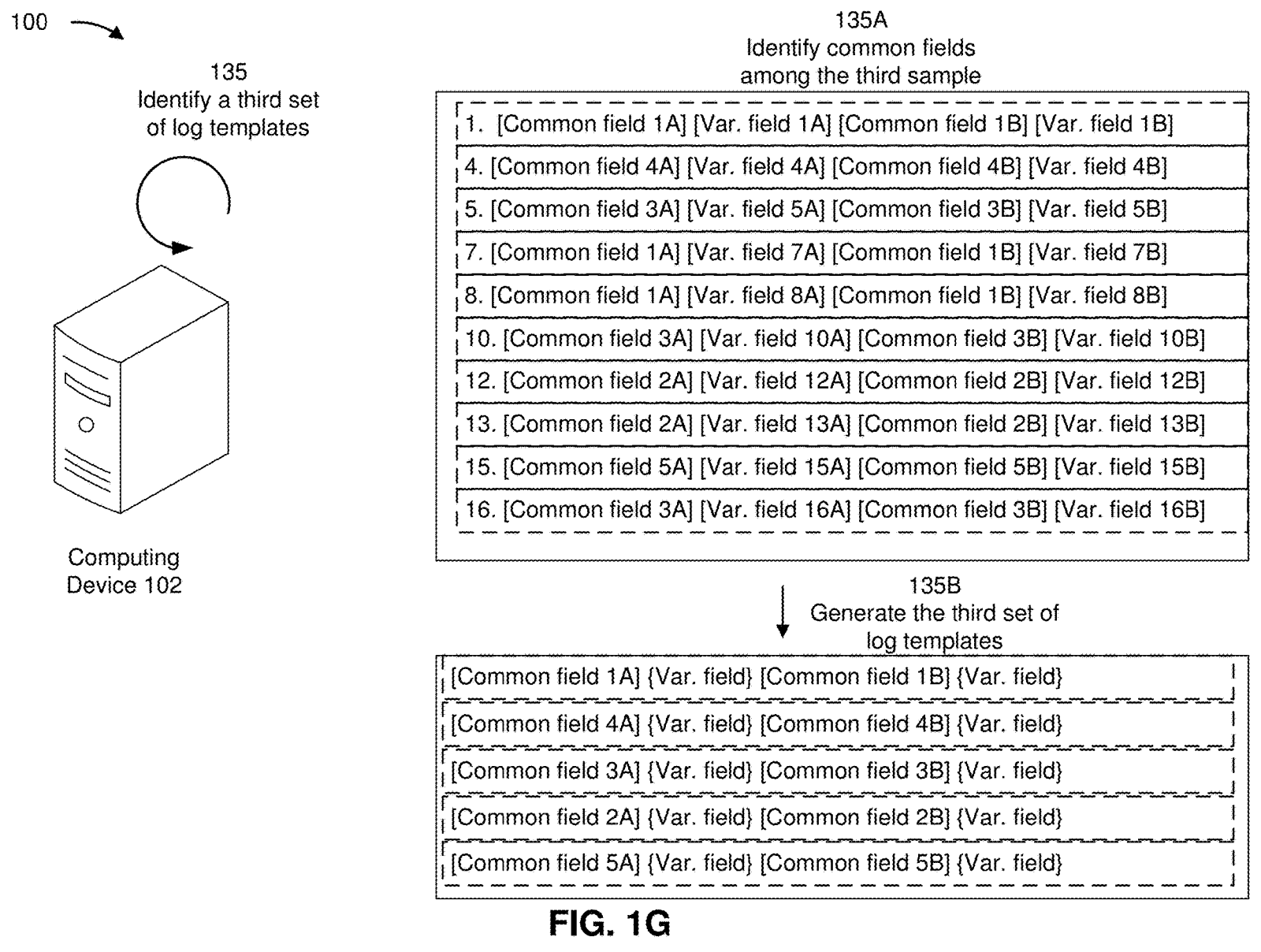

135
Identify a third set of log templates

Computing Device 102

135A
Identify common fields among the third sample

1. [Common field 1A] [Var. field 1A] [Common field 1B] [Var. field 1B]
4. [Common field 4A] [Var. field 4A] [Common field 4B] [Var. field 4B]
5. [Common field 3A] [Var. field 5A] [Common field 3B] [Var. field 5B]
7. [Common field 1A] [Var. field 7A] [Common field 1B] [Var. field 7B]
8. [Common field 1A] [Var. field 8A] [Common field 1B] [Var. field 8B]
10. [Common field 3A] [Var. field 10A] [Common field 3B] [Var. field 10B]
12. [Common field 2A] [Var. field 12A] [Common field 2B] [Var. field 12B]
13. [Common field 2A] [Var. field 13A] [Common field 2B] [Var. field 13B]
15. [Common field 5A] [Var. field 15A] [Common field 5B] [Var. field 15B]
16. [Common field 3A] [Var. field 16A] [Common field 3B] [Var. field 16B]

135B
Generate the third set of log templates

[Common field 1A] {Var. field} [Common field 1B] {Var. field}
[Common field 4A] {Var. field} [Common field 4B] {Var. field}
[Common field 3A] {Var. field} [Common field 3B] {Var. field}
[Common field 2A] {Var. field} [Common field 2B] {Var. field}
[Common field 5A] {Var. field} [Common field 5B] {Var. field}

1. [Common field 1A] {1A, 7A, 8A, 14A} [Common field 1B] {1B, 7B, 8B, 14B}

2. [Common field 2A] {2A, 12A, 13A} [Common field 2B] {2B, 12B, 13B}

3. [Common field 3A] {3A, 5A, 10A, 16A, *nA*} [Common field 3B] {3B, 5B, 10B, 16B, *nB*}

4. [Common field 4A] {4A, 6A, 9A} [Common field 4B] [Var. field 4B]

11. [Common field 5A] {11A, 15A} [Common field 5B] {11B, 15B}

DETERMINING LOG TEMPLATES OF A COMPUTING DEVICE FOR LOG TEMPLATIZATION

BACKGROUND

Modern applications (computer-implemented applications) involve thousands of moving components and lines of code. In some computing fields, such as edge environments, complexity of applications increases. In such fields, faults may occur where a particular process fails. In some complex environments, multiple faults may even occur at the same time at different places.

Manual debugging and remediation may not be humanly possible within a reasonable timeframe for the environments. Therefore, closed-loop self-healing systems may be deployed, in which faults are detected and remediated automatically on the fly. One source of information used for the closed-loop self-healing systems is logs. The logs provide fine-grained information about system behavior as inputs to the closed-loop self-healing systems.

SUMMARY

In some implementations, a method comprising: obtaining a set of log lines associated with operations performed at a computing device; selecting a first sample of the set of log lines; identifying a first set of log templates from the first sample, the first set of log templates having a first quantity of log templates; selecting a second sample of the set of log lines; identifying a second set of log templates from the second sample, the second set of log templates having a second quantity of log templates; and applying the first set of log templates to the set of log lines for log templatization based at least in part on the first quantity of log templates being equal to the second quantity of log templates.

In some implementations, a computer program product comprising: one or more computer readable storage media, and program instructions collectively stored on the one or more computer readable storage media, the program instructions comprising: program instructions to obtain a set of log lines associated with operations performed at a computing device; program instructions to select a first sample of the set of log lines; program instructions to identify a first set of log templates from the first sample, the first set of log templates having a first quantity of log templates; program instructions to select a second sample of the set of log lines that is larger than the first sample; program instructions to identify a second set of log templates from the second sample, the second set of log templates having a second quantity of log templates; and program instructions to apply the first set of log templates to the set of log lines for log templatization based at least in part on the first quantity of log templates being equal to the second quantity of log templates.

In some implementations, a system comprising: one or more devices configured to: obtain a set of log lines associated with operations performed at a computing device; select a first sample of the set of log lines; identify a first set of log templates from the first sample, the first set of log templates having a first quantity of log templates; select a second sample of the set of log lines that is larger than the first sample; identify a second set of log templates from the second sample, the second set of log templates having a second quantity of log templates that is greater than the first quantity of log templates; select a third sample of the set of log lines that is larger than second sample; identify a third set of log templates from the third sample, the third set of log templates having a third quantity of log templates that is equal to the second quantity of log templates; and apply the second set of log templates to the set of log lines for log templatization based at least in part on the second quantity of log templates being equal to the third quantity of log templates.

BRIEF DESCRIPTION OF THE DRAWINGS

FIGS. 1A-1H are diagrams of an example implementation described herein.

DETAILED DESCRIPTION

Figure 1A:
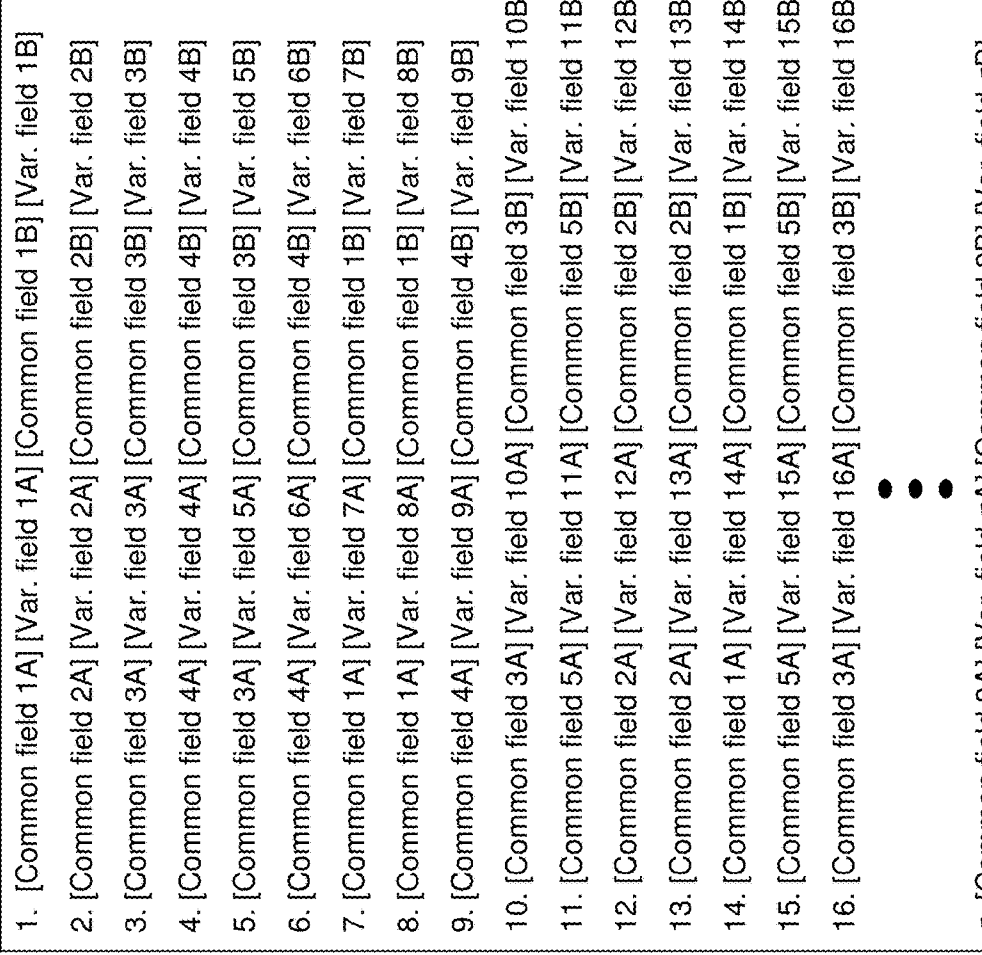

The following detailed description of example implementations refers to the accompanying drawings. The same reference numbers in different drawings may identify the same or similar elements.

Logs may be generated by computing devices or applications when performing computing processes. These logs describe activities happening within a system that performs the computing processes. Due to the ever-increasing volume of log data that is generated by computing devices, it may be important to manage, observe, and analyze log data efficiently. For example, it may be important to handle large volumes of log data for effective fault management.

Log analysis is the process of deriving insights from logs to gain information about a system's health and performance. Log analysis may assist site reliability engineers (SREs) in downstream tasks such as anomaly detection or root cause analysis, among other examples. Based at least in part on using log analysis, SREs may reduce a mean time to detect and resolve an issue.

To perform automated log analysis, a system is to understand a log structure. For example, the system may perform log parsing or templatization. Log templatization refers to extracting dynamic (variables) and common (constant parts) of a log line. Because log lines repeat, millions of lines of log data may contain only hundreds of distinct log lines. By using log templatization, the system may apply structure to log data, reduce log volume size, and apply useful feature representation for downstream tasks such as anomaly detection.

Running templatization on raw logs takes lot of time and consumes computing resources. As log dataset sizes increase, time and consumption of computing resources also increase. A computing system may have sufficient resources in a large cloud environment, but doing so in other systems, such as an edge environment, is either infeasible or very costly.

Further, with microservices-based architectures and DevOps practices, applications may evolve rapidly and generate new types of logs. Ever-changing logs may necessitate periodic retraining of a templatization model. Performing templatization offline before deployment may not be feasible as it can slow down a CI/CD pipeline and software release cycles.

Log templatization is a priority for automated log analysis as it is used for a variety of downstream tasks (e.g., log anomaly detection or root cause analysis, among other examples). Therefore, a system may use a hyper-parameter tuning to get accurate templates. Retraining a model on an entire log dump multiple times is resource-expensive and not feasible in practical scenarios.

In some aspects described herein, a system may identify a log representative set that has the same of templates as the original log dump. In other words, the proposed system may identify representative log lines required for effective templatization as opposed to using the entire log dump. Given a log dump D containing a set of N log lines, the system may obtain a representative set P of M log lines that will give the same templates as the original log dump D. For example, Templates (D)==Templates (P), M<<N. In this way, the system may perform templatization using a subset of data, which may consume fewer computing resources. Additionally, as the applications evolve over time, the system may train using only the logs required for learning new templates rather that an entire log dump. Further, due to using a smaller dataset size, hyper-parameter optimization for templatization may be easier, which may support accurate representations of logs.

As described, for a log dump D that includes a set of N log lines, the system may attempt to identify a representative set P of M log lines that can be used to identify a same set of templates as the original log dump D, where Templates (D)==Templates (P), M<<N. To get the representative set P, the system may perform an iterative approach that uses incremental sampling and clustering techniques. For example, operations of one iteration may include using text-clustering techniques on the sample log lines to form groups of a log sample S. After clustering, the system may use inter-cluster distance metrics to combine groups that lie close to each other. Since, the groups include a disjoint set of logs, the system may run log templatization on all the groups parallelly. After group-wise templatization, the system may collect the templates generated from the groups.

In an attempt to conserve computing resources of the computing device, the computing device may attempt multiple sample sizes of sequentially increasing size. For example, the computing device may begin with an initial log sample $S_1$ (size N/k) and perform templatization. The system may continue to expand the sample size of S (e.g., by using increments such as 2N/K, 3N/K, etc.). Samples $S_i$ have a size (i*N/k) where i is an integer [1 . . . . K]. The system may stop expanding the sample size of S if a set of templates do not change in two consecutive iterations (e.g., Templates ($S_{i+1}$) ==Templates ($S_i$)). Using this criteria, an ideal log partition P may be $S_i$ because this sample gives the same templates as $S_{i+1}$ and hence, it is unlikely that a larger data set will produce more log templates than the log partition P.

In another example, an initial sample may be too large. For example, the first sample and the second sample may have a same set of templates. In this case, the first sample may be an efficient size, but it is possible that a smaller sample may be more efficient. To deal with this situation, the system may reduce the sample size of S (by an amount of N/2k, N/4k, and so on). These samples may be referred to a $S_j$, of size (N/k*1/j) where j is an integer [0 . . . ceil ($\log_2$ (N/k))]. If sets of templates change in two consecutive iterations, then the system may stop and use the larger sample of the two consecutive iterations. For example, the system may stop the procedure if Templates ($S_{j+1}$)≠Templates ($S_j$). In this case, the ideal log partition P may be $S_j$. As $S_{j+1}$ is smaller in size than $S_j$, $S_{j+1}$ may lose some templates so the system will use the next bigger sample $S_j$.

In an example of selecting a sample for templatization, a computing device may select a first sample $S_1$ of k logs out of N total logs, where $S_1=\{X_a|a\in[0, N/k]\ \&\ X_a\in D\}$. The computing device may perform clustering on the first sample to identify a first set of log templates. For example, clustering may include initial log clustering and then reducing log clusters using inter-cluster distances. The computing device may then select a second sample $S_2$ of k logs out of N total logs, where $S_2=\{X_a|a\in[0, 2N/k]\ \&\ X_a\in D\}$. Similarly, the computing device may identify a second set of log templates from the second sample. If the first set of log templates and the second set of log templates match (e.g., are identical or within a threshold cluster distance), the computing device may stop and use the first set or the second set (they may be identical or within a threshold similarity) for log templatization.

However, if the first set and the second set are different (e.g., a template is within the first set of log templates that does not match any template of the second set of log templates), the process may be repeated with a third sample. For example, the third sample may be $S_3=\{X_a|\ a\in[0, 3N/k]\ \&\ X_a\in D\}$. The process may be repeated until two sequential samples produce log template sets that match.

As an example of a module to perform the procedure, a computing device may perform the following operations or similar operations:

```
Parameters: Log Dump (D) of size N; Partition Parameter K; Inter-cluster distance
threshold d;
function log_partition(D, K, d):
  sample_size = N/K
  prev_templates = sample_cluster_and_templatise(D, sample_size, d)
  curr_templates = null
  while (prev_templates != curr_templates)
    sample_size += N/K
    curr_templates = sample_cluster_and_templatise(D, sample_size, d)
  if sample_size > N/K:
    sample_size -= N/K
  else if sample_size == N/K:
  curr_templates = null
    while (prev_templates != curr_templates)
        sample_size /= 2
      curr_templates = sample_cluster_and_templatize(D, sample_size,
      d)
return prev_templates
```

The system may be applied to edge environments (e.g., local environments rather than on the cloud) where devices are resource constrained. Since logs have a repeating nature, templates learned on one edge site (e.g., a computing device) can be applied to other peers. In this way, there is no need to run templatization on all the edge sites because a subset of edge sites may generate the templates for other edge sites. As an associated application evolves, the system may collect newer logs from each edge site and learn new templates from the only logs that are unrecognized using an existing set of log templates.

FIGS. 1A-1F are diagrams of an example implementation 100 described herein. As shown in FIGS. 1A-1F, example implementation 100 includes a computing device 102 configured to operate on log lines to perform templatization.

As shown in FIG. 1A, and by reference number 105, the computing device 102 may obtain a set of log lines. In some aspects, the computing device 102 may obtain the set of log lines from operations or processes performed locally at the computing device 102. Alternatively, the computing device 102 may obtain the set of log lines from operations performed at another computing device or operations performed between multiple computing devices.

The set of log lines include log lines having common fields (e.g., common fields 1A-5A and/or common fields 1B-5B). In some aspects, the log lines may have one common field, two common fields, or more common fields. The log lines may also have variable fields ("Var." fields) such as variable fields 1A-nA and/or variable fields 1B-nB.

As shown in FIG. 1A, several of the log lines include the same (or matching through clustering) common fields. Because of this, the computing device 102 may unnecessarily consume computing resources to save and process the full set of log lines for templatization.

Figure 1B:
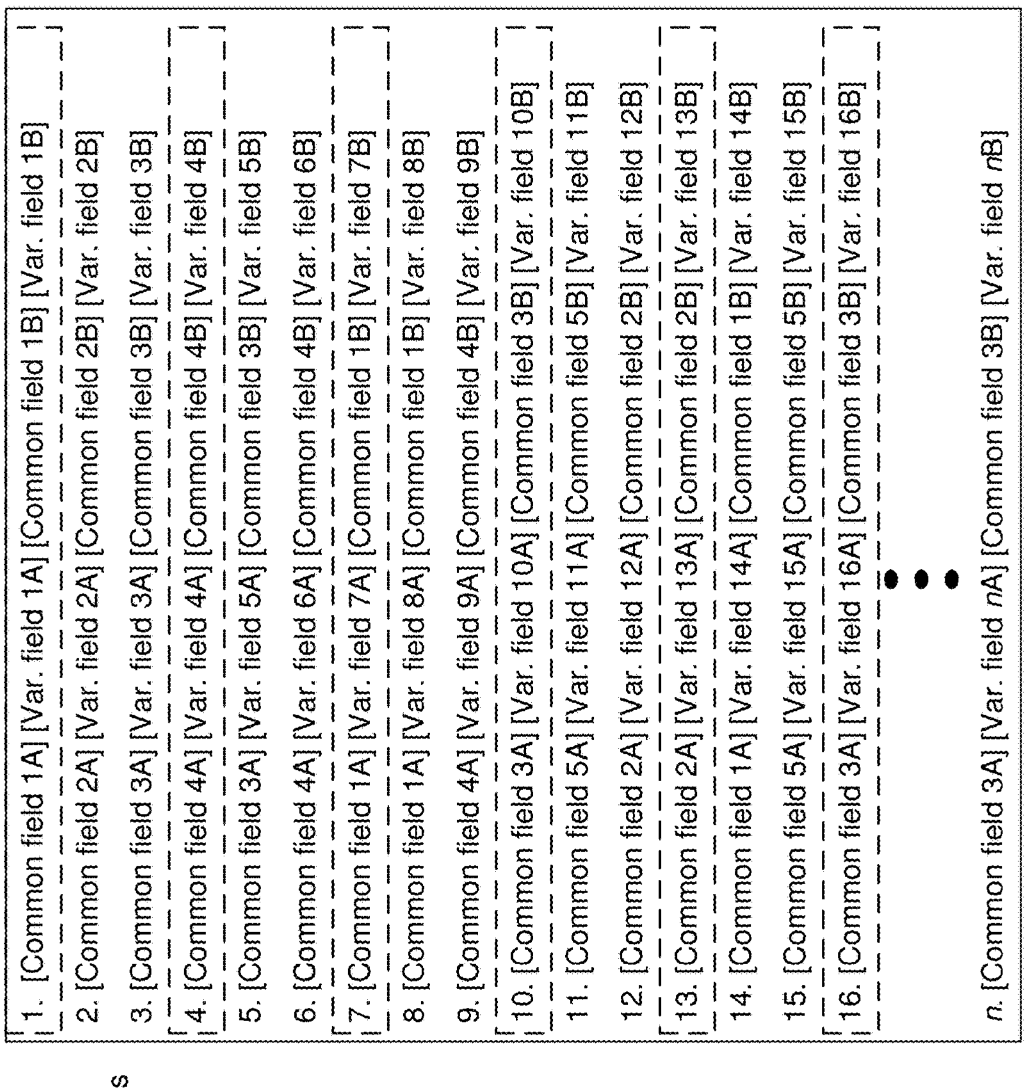

As shown in FIG. 1B, and by reference number 110, the computing device 102 may select a first sample of log lines from the set of log lines described in connection with reference number 105. As shown in FIG. 1B, the computing device 102 may select the first sample as 1 log line for every p log lines of the full set (e.g., shown as p=3). Alternatively, the first sample may include multiple consecutive log lines or multiple sets of consecutive log lines.

Figure 1C:
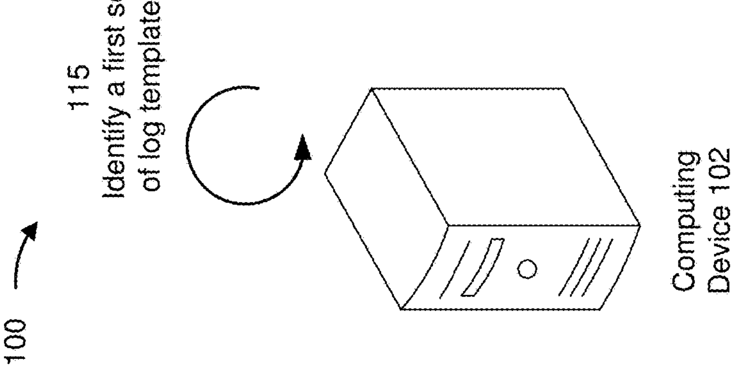
Figure 1C:
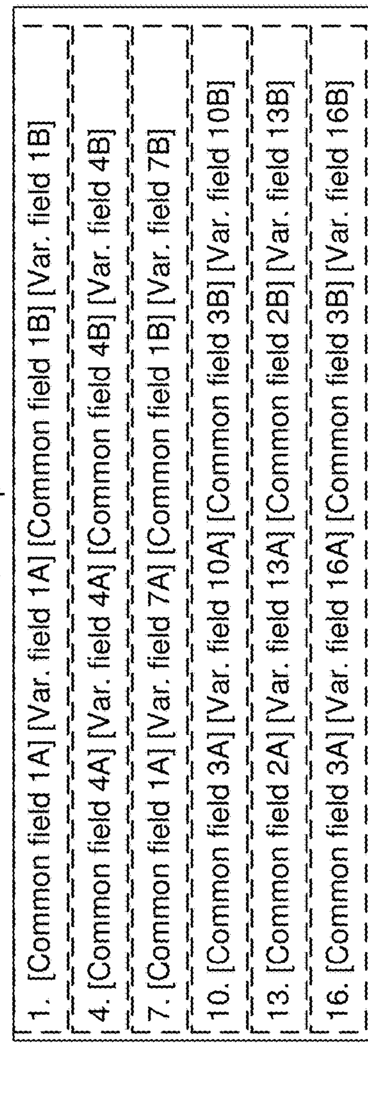

As shown in FIG. 1C, and by reference number 115, the computing device 102 may identify a first set of log templates from the first sample of log lines. For example, as shown by reference number 115A, the computing device 102 may identify common fields among the first sample. The computing device 102 may use clustering to identify the common fields or may identify the common fields as identical fields within multiple log lines, among other examples to identify common fields. As shown by reference number 115B, the computing device 102 may generate the first set of log templates based at least in part on identifying the common fields among the first sample. As shown, the set of log templates of the first sample are reduced to four unique log templates having common fields 1A/1B, 4A/4B, 3A/3B, and 2A/2B.

Figure 1D:
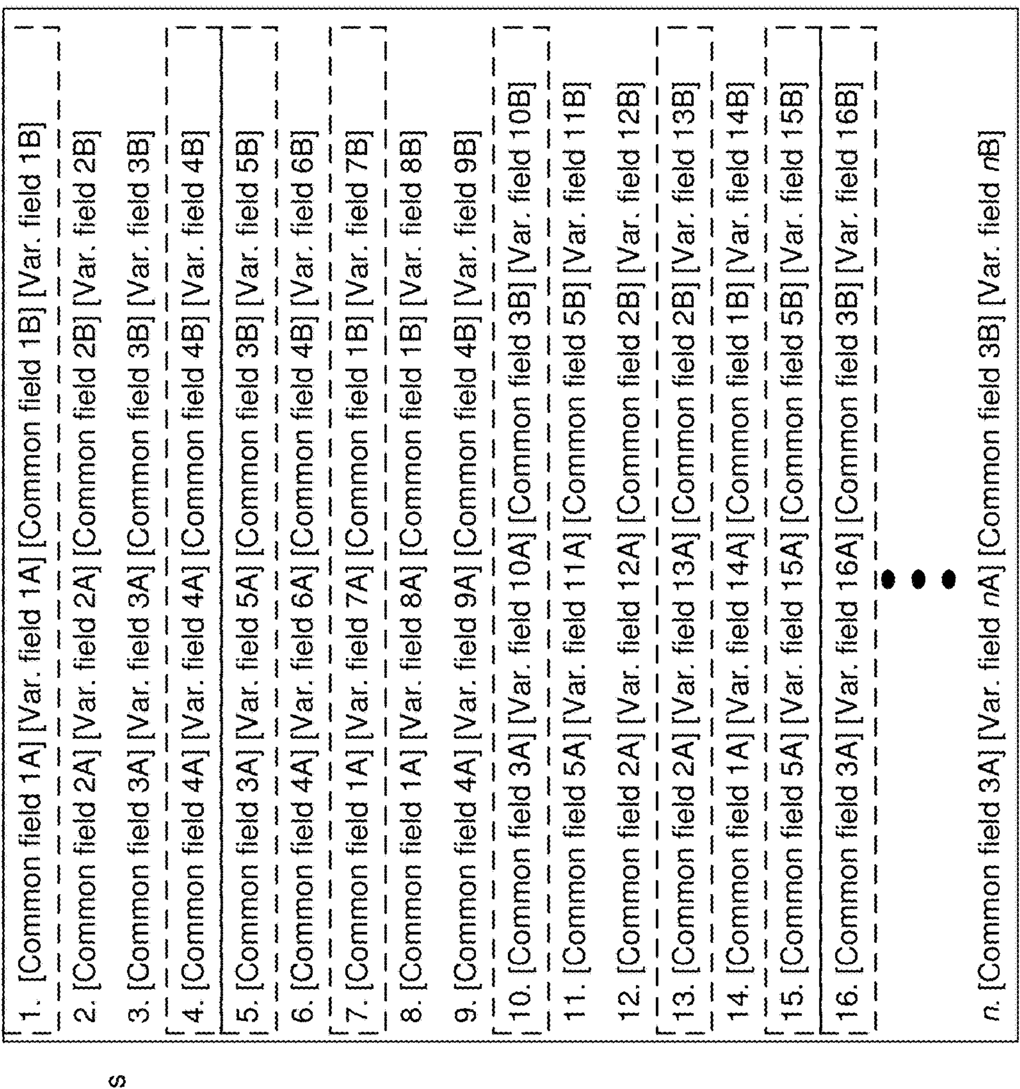

As shown in FIG. 1D, and by reference number 120, the computing device 102 may select a second sample of log lines from the set of log lines described in connection with reference number 105. As shown in FIG. 1D, the computing device 102 may select the second sample as adding to the first sample with 1 log line for every q log lines of the full set (e.g., shown as q=5). Alternatively, the second sample may add multiple consecutive log lines or multiple sets of consecutive log lines to the first sample. In other examples, the second sample may be the same size as the first sample, with the second sample having a different strategy for selecting the log lines to be in the second sample.

As shown in FIG. 1E, and by reference number 125, the computing device 102 may identify a second set of log templates from the second sample of log lines. For example, as shown by reference number 125A, the computing device 102 may identify common fields among the second sample. The computing device 102 may use clustering to identify the common fields or may identify the common fields as identical fields within multiple log lines, among other examples to identify common fields. As shown by reference number 125B, the computing device 102 may generate the second set of log templates based at least in part on identifying the common fields among the second sample. As shown, the set of log templates of the second sample are reduced to five unique log templates having common fields 1A/1B, 4A/4B, 3A/3B, 2A/2B, and 5A/5B.

Note that common fields 5A/5B were not in the first set of log templates. Based at least in part on the second set of lot templates not matching the first set of lot templates, the computing device may determine that the first sample is insufficient to use for log templatization and that the first set of log templates is incomplete. Based at least in part on the first sample being determined to be insufficient, the computing device 102 may attempt to determine whether the second sample is sufficient for templatization and whether the second set of templates is complete.

Figure 1F:
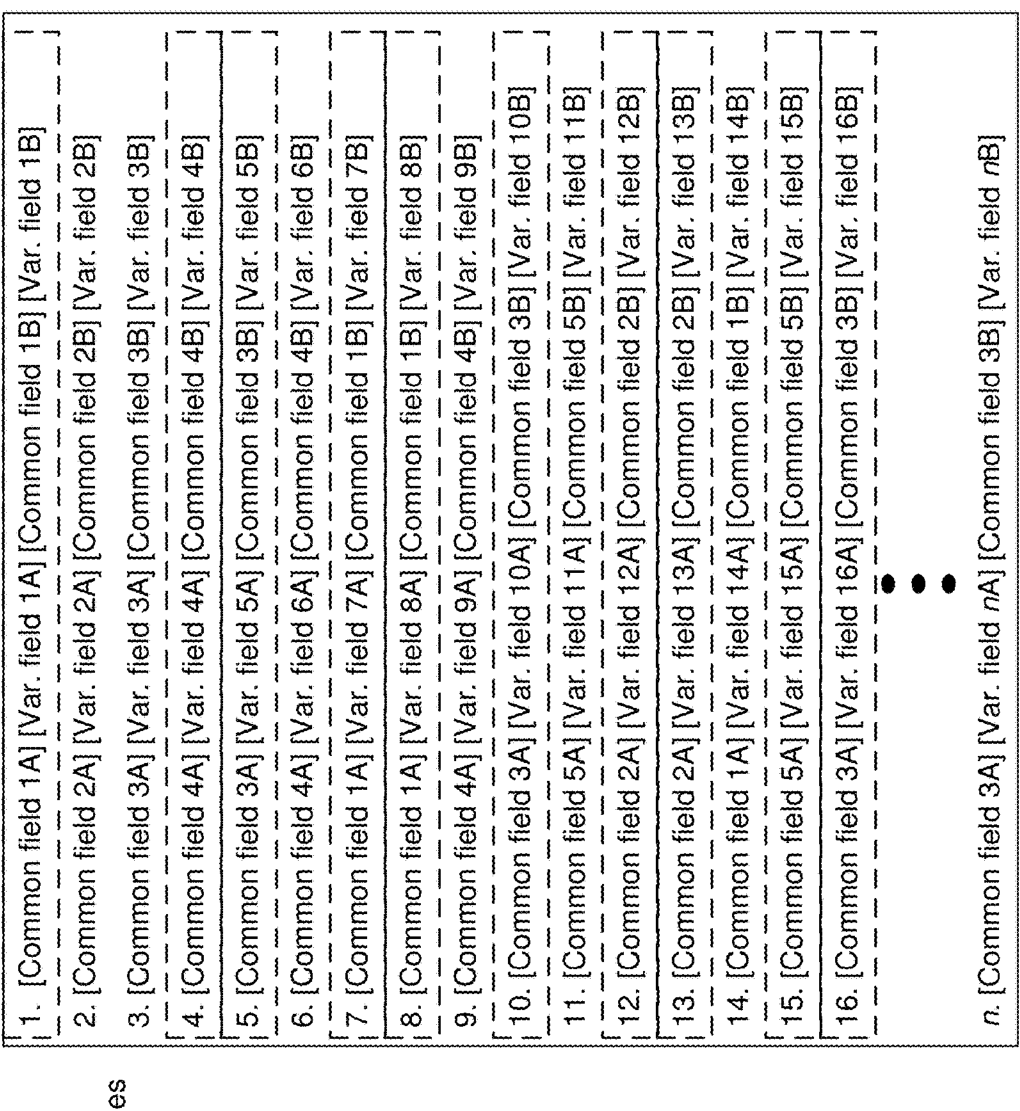

As shown in FIG. 1F, and by reference number 130, the computing device 102 may select a third sample of log lines from the set of log lines described in connection with reference number 105. As shown in FIG. 1F, the computing device 102 may select the third sample as adding to the second sample with 1 log line for every r log lines of the full set (e.g., shown as r=4). Alternatively, the third sample may add multiple consecutive log lines or multiple sets of consecutive log lines to the second sample. In other examples, the third sample may be the same size as the second sample, with the third sample having a different strategy for selecting the log lines to be in the third sample.

As shown in FIG. 1G, and by reference number 135, the computing device 102 may identify a third set of log templates from the third sample of log lines. For example, as shown by reference number 125A, the computing device 102 may identify common fields among the third sample. The computing device 102 may use clustering to identify the common fields or may identify the common fields as identical fields within multiple log lines, among other examples to identify common fields. As shown by reference number 135B, the computing device 102 may generate the third set of log templates based at least in part on identifying the common fields among the third sample. As shown, the set of log templates of the third sample are reduced to five unique log templates having common fields 1A/1B, 4A/4B, 3A/3B, 2A/2B, and 5A/5B.

Note that common fields of the third set of log templates matches the common fields of the second set of log templates. In this way, the third set of log templates matches the second set of log templates. Based at least in part on the third set of lot templates matching the second set of lot templates, the computing device may determine that the second sample is sufficient to use for log templatization and that the second set of log templates is complete. Based at least in part on the first sample being determined to be sufficient, the computing device 102 may stop testing samples of increasing size.

Figure 1H:
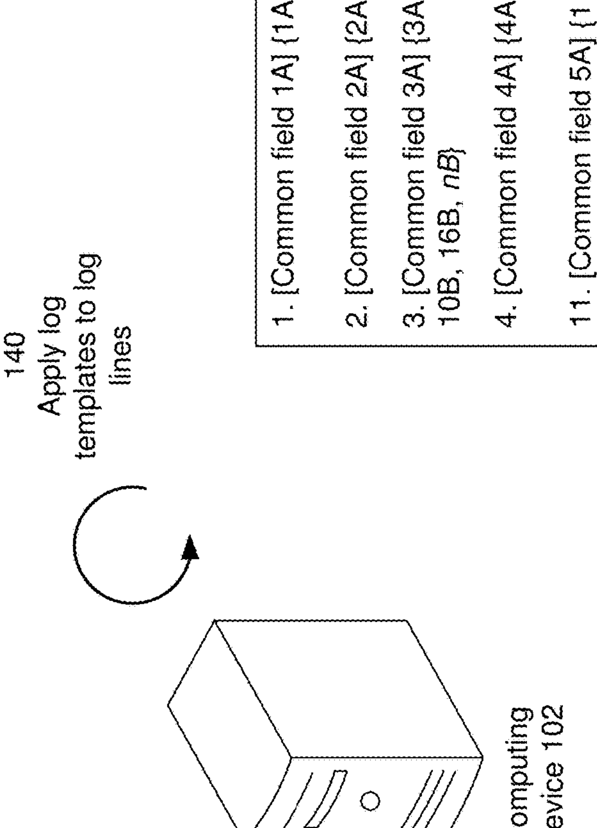

As shown in FIG. 1H, and by reference number 140, the computing device 102 may apply the log templates to log lines of the set of log lines. As shown in FIG. 1H, the full set of log lines may be grouped by templates. In this way, the data associated with the log lines may be reduced or compressed into organized groups that can be stored or provided for analysis. In some aspects, the computing device 102 may retain data of the variable fields. In other aspects, the computing device 102 may discard the variable fields and retain the common fields.

As indicated above, FIGS. 1A-1H are provided as an example. Other examples may differ from what is described with regard to FIGS. 1A-1H. The number and arrangement of devices shown in FIGS. 1A-1H are provided as an example.

Figure 2A:
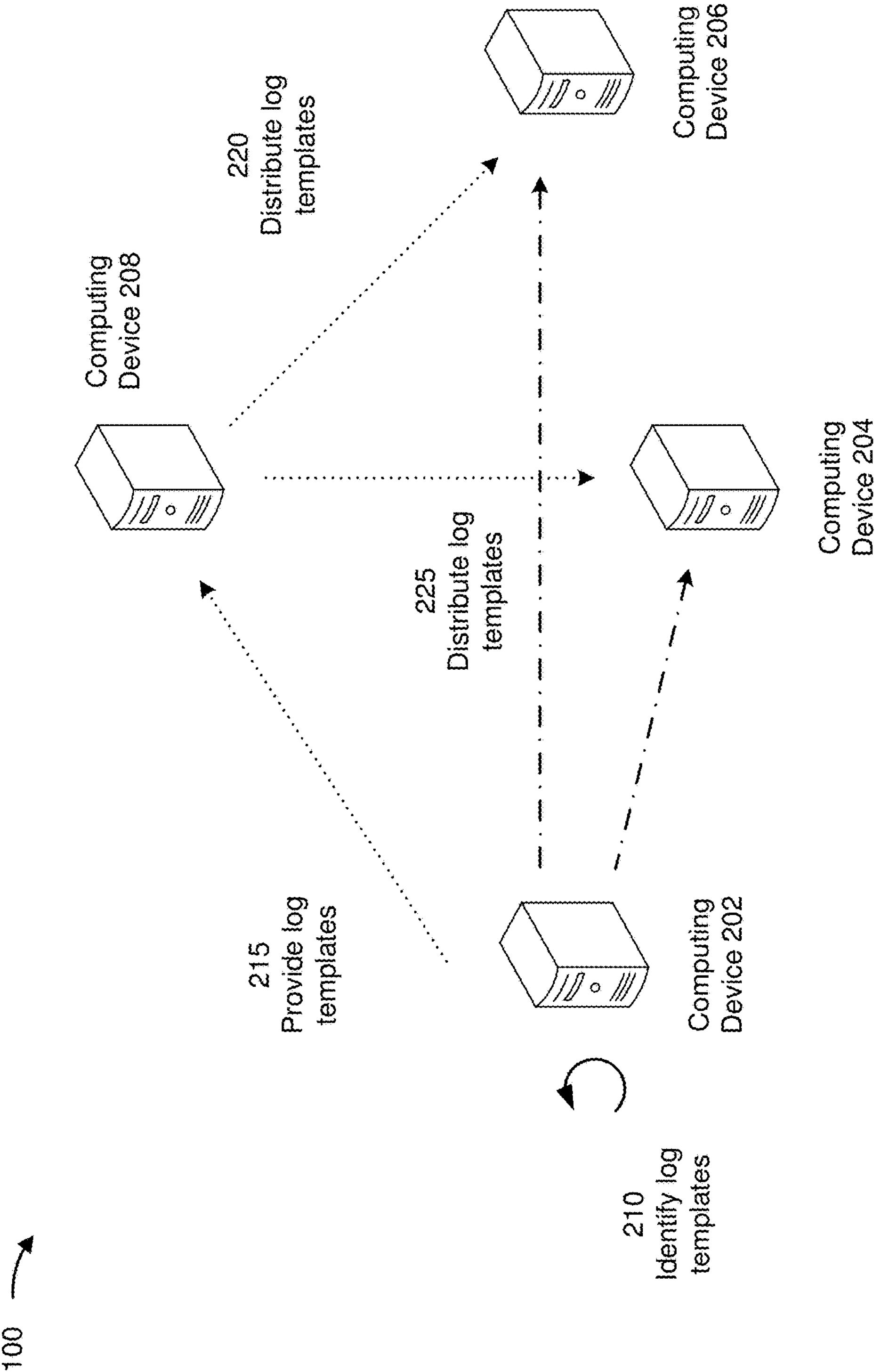
FIGS. 2A-2B are diagrams of an example implementation described herein.
Figure 2B:
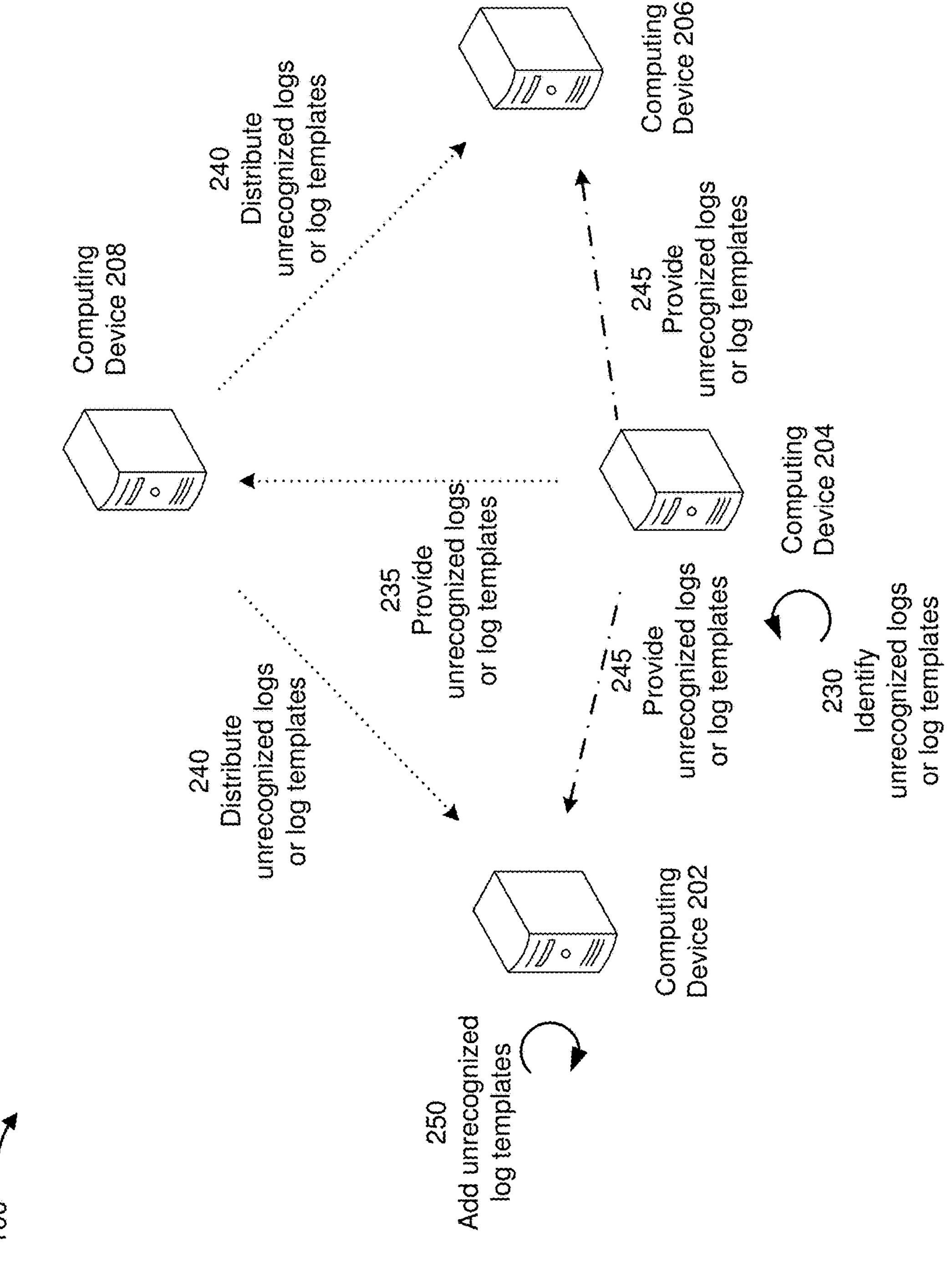

FIGS. 2A-2B are diagrams of an example implementation 100 described herein. As shown in FIGS. 2A-2B, example implementation 100 includes a set of computing devices 202, 204, 206, and 208 configured to operate on log lines to perform templatization. Any of the computing devices of FIGS. 2A-2B may include or be included in computing device 102. In some aspects, the computing devices 202, 204, and 206 may be computing devices configured to perform operations that generate log lines (e.g., edge devices or edge sites, among other examples). In some aspects, computing device 208 may include a central hub associated with distributing log templates to the computing devices 202, 204, and 206.

As shown in FIG. 2A, and by reference number 210, computing device 202 may identify log templates. For example, computing device 202 may identify the log templates using a sampling technique to generate a set of templates as described in connection with FIGS. 1A-1H. In some aspects, computing device 202 may use the logs and templates for log analysis or may provide the logs (e.g., after templatization and compression) to another device for log analysis.

As shown by reference number 215, the computing device 102 may provide the log templates to computing device 208. As shown by reference number 220, computing device 208 may distribute the log templates to computing device 204 and computing device 206. In this way, computing device 208 may function as a central hub for distribution to peer devices.

In some aspects, as shown by reference number 225, computing device 202 may distribute the log templates to computing device 204 and computing device 206 directly, rather than through computing device 208. For example, computing device 202 may use protocol (e.g., GOSSIP protocol), where edge sites can share learned templates to other edge sites.

Based at least in part on computing device 202 identifying the log templates and computing devices 204 and 206 receiving the log templates (or indications of the log templates), computing devices 204 and 206 may conserve computing resources that may have otherwise been used to identify the log templates independently.

As shown in FIG. 2B, and by reference number 230, computing device 204 may identify unrecognized logs or log templates. For example, the unrecognized logs may not fit into any of the log templates identified by computing device 202 in connection with FIG. 2A, or computing device 204 may identify unrecognized logs that form a log template not identified by computing device 202.

As shown by reference number 235, computing device 204 may provide the unrecognized logs or log templates to computing device 208 for distribution to other computing devices. As shown by reference number 240, computing device 208 may distribute the unrecognized logs or log templates to computing device 202 and/or computing device 206.

In some aspects, as shown by reference number 245, computing device 204 may provide unrecognized logs or log templates directly to computing device 202 or computing device 206 instead of through computing device 208.

Based at least in part on sharing log templates among computing devices, all data does not have to be collected at a single computing device (e.g., edge site) and a trigger event at one computing device (e.g., an application update) may cause one computing device to retrain the log templatization and share with the other computing devices without the need to wait for failed templatization at the other computing devices associated with the application update.

Based at least in part on computing device 202 receiving the unrecognized logs or log templates, computing device 202 may add the unrecognized logs. For example, if computing device 204 provided the log templates, computing device 202 may add the log templates to those identified in connection with FIG. 2A. If computing device 204 provided the unrecognized logs, computing device 202 may perform clustering or another technique to identify one or more log templates associated with the unrecognized logs.

As indicated above, FIGS. 2A-2B are provided as an example. Other examples may differ from what is described with regard to FIGS. 2A-2B. The number and arrangement of devices shown in FIGS. 2A-2B are provided as an example.

Figure 3:
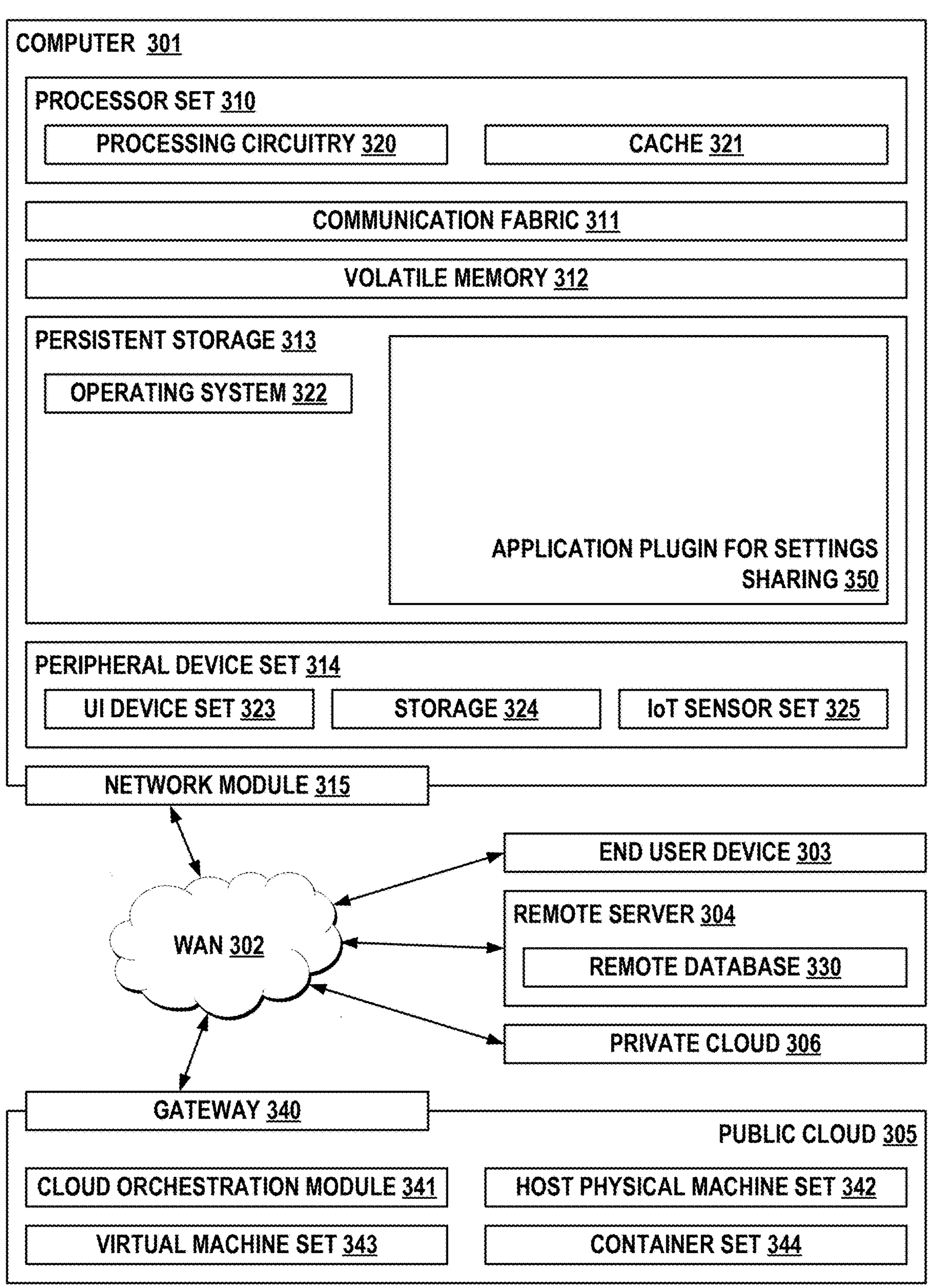
FIG. 3 is a diagram of an example computing environment in which systems and/or methods described herein may be implemented.

FIG. 3 is a diagram of an example computing environment 300 in which systems and/or methods described herein may be implemented. Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 300 contains an example of an environment for the execution of at least some of the computer code involved in performing the inventive methods, such as application plugin for determining templates 350. In addition to application plugin for determining templates 350, computing environment 300 includes, for example, computer 301, wide area network (WAN) 302, end user device (EUD) 303, remote server 304, public cloud 305, and private cloud 306. In this embodiment, computer 301 includes processor set 310 (including processing circuitry 320 and cache 321), communication fabric 311, volatile memory 312, persistent storage 313 (including operating system 322 and application plugin for determining templates 350, as identified above), peripheral device set 314 (including user interface (UI) device set 323, storage 324, and Internet of Things (IoT) sensor set 325), and network module 315. Remote server 304 includes remote database 330. Public cloud 305 includes gateway 340, cloud orchestration module 341, host physical machine set 342, virtual machine set 343, and container set 344.

Computer 301 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 330. As is well understood in the art of computer technology, and depending upon the technology, performance of a computer-implemented method may be distributed among multiple computers and/or between multiple locations. On the other hand, in this presentation of computing environment 300, detailed discussion is focused on a single computer, specifically computer 301, to keep the presentation as simple as possible. Computer 301 may be located in a cloud, even though it is not shown in a cloud in FIG. 3. On the other hand, computer 301 is not required to be in a cloud except to any extent as may be affirmatively indicated.

Processor set 310 includes one, or more, computer processors of any type now known or to be developed in the future. Processing circuitry 320 may be distributed over multiple packages, for example, multiple, coordinated integrated circuit chips. Processing circuitry 320 may implement multiple processor threads and/or multiple processor cores. Cache 321 is memory that is located in the processor chip package(s) and is typically used for data or code that should be available for rapid access by the threads or cores running on processor set 310. Cache memories are typically organized into multiple levels depending upon relative proximity to the processing circuitry. Alternatively, some, or all, of the cache for the processor set may be located "off chip." In some computing environments, processor set 310 may be designed for working with qubits and performing quantum computing.

Computer readable program instructions are typically loaded onto computer 301 to cause a series of operational steps to be performed by processor set 310 of computer 301 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 321 and the other storage media discussed below. The program instructions, and associated data, are accessed by processor set 310 to control and direct performance of the inventive methods. In computing environment 300, at least some of the instructions for performing the inventive methods may be stored in application plugin for determining templates 350 in persistent storage 313.

Communication fabric 311 is the signal conduction path that allows the various components of computer 301 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 312 is any type of volatile memory now known or to be developed in the future. Examples include dynamic type random access memory (RAM) or static type RAM. Typically, volatile memory 312 is characterized by random access, but this is not required unless affirmatively indicated. In computer 301, the volatile memory 312 is located in a single package and is internal to computer 301, but, alternatively or additionally, the volatile memory may be distributed over multiple packages and/or located externally with respect to computer 301.

Persistent storage 313 is any form of non-volatile storage for computers that is now known or to be developed in the future. The non-volatility of this storage means that the stored data is maintained regardless of whether power is being supplied to computer 301 and/or directly to persistent storage 313. Persistent storage 313 may be a read only memory (ROM), but typically at least a portion of the persistent storage allows writing of data, deletion of data and re-writing of data. Some familiar forms of persistent storage include magnetic disks and solid state storage devices. Operating system 322 may take several forms, such as various known proprietary operating systems or open source Portable Operating System Interface-type operating systems that employ a kernel. The code included in application plugin for settings sharing 350 typically includes at least some of the computer code involved in performing the inventive methods.

Peripheral device set 314 includes the set of peripheral devices of computer 301. Data communication connections between the peripheral devices and the other components of computer 301 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 323 may include components such as a display screen, speaker, microphone, wearable devices (such as goggles and smart watches), keyboard, mouse, printer, touchpad, game controllers, and haptic devices. Storage 324 is external storage, such as an external hard drive, or insertable storage, such as an SD card. Storage 324 may be persistent and/or volatile. In some embodiments, storage 324 may take the form of a quantum computing storage device for storing data in the form of qubits. In embodiments where computer 301 is required to have a large amount of storage (for example, where computer 301 locally stores and manages a large database) then this storage may be provided by peripheral storage devices designed for storing very large amounts of data, such as a storage area network (SAN) that is shared by multiple, geographically distributed computers. IoT sensor set 325 is made up of sensors that can be used in Internet of Things applications. For example, one sensor may be a thermometer and another sensor may be a motion detector.

Network module 315 is the collection of computer software, hardware, and firmware that allows computer 301 to communicate with other computers through WAN 302. Network module 315 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 315 are performed on the same physical hardware device. In other embodiments (for example, embodiments that utilize software-defined networking (SDN)), the control functions and the forwarding functions of network module 315 are performed on physically separate devices, such that the control functions manage several different network hardware devices. Computer readable program instructions for performing the inventive methods can typically be downloaded to computer 301 from an external computer or external storage device through a network adapter card or network interface included in network module 315.

WAN 302 is any wide area network (for example, the internet) capable of communicating computer data over non-local distances by any technology for communicating computer data, now known or to be developed in the future. In some embodiments, the WAN 302 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 303 is any computer system that is used and controlled by an end user (for example, a customer of an enterprise that operates computer 301) and may take any of the forms discussed above in connection with computer 301. EUD 303 typically receives helpful and useful data from the operations of computer 301. For example, in a hypothetical case where computer 301 is designed to provide a recommendation to an end user, this recommendation would typically be communicated from network module 315 of computer 301 through WAN 302 to EUD 303. In this way, EUD 303 can display, or otherwise present, the recommendation to an end user. In some embodiments, EUD 303 may be a client device, such as thin client, heavy client, mainframe computer, desktop computer and so on.

Remote server 304 is any computer system that serves at least some data and/or functionality to computer 301. Remote server 304 may be controlled and used by the same entity that operates computer 301. Remote server 304 represents the machine(s) that collect and store helpful and useful data for use by other computers, such as computer 301. For example, in a hypothetical case where computer 301 is designed and programmed to provide a recommendation based on historical data, then this historical data may be provided to computer 301 from remote database 330 of remote server 304.

Public cloud 305 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 305 is performed by the computer hardware and/or software of cloud orchestration module 341. The computing resources provided by public cloud 305 are typically implemented by virtual computing environments that run on various computers making up the computers of host physical machine set 342, which is the universe of physical computers in and/or available to public cloud 305. The virtual computing environments (VCEs) typically take the form of virtual machines from virtual machine set 343 and/or containers from container set 344. It is understood that these VCEs may be stored as images and may be transferred among and between the various physical machine hosts, either as images or after instantiation of the VCE. Cloud orchestration module 341 manages the transfer and storage of images, deploys new instantiations of VCEs and manages active instantiations of VCE deployments. Gateway 340 is the collection of computer software, hardware, and firmware that allows public cloud 305 to communicate through WAN 302.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 306 is similar to public cloud 305, except that the computing resources are only available for use by a single enterprise. While private cloud 306 is depicted as being in communication with WAN 302, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 305 and private cloud 306 are both part of a larger hybrid cloud.

Figure 4:
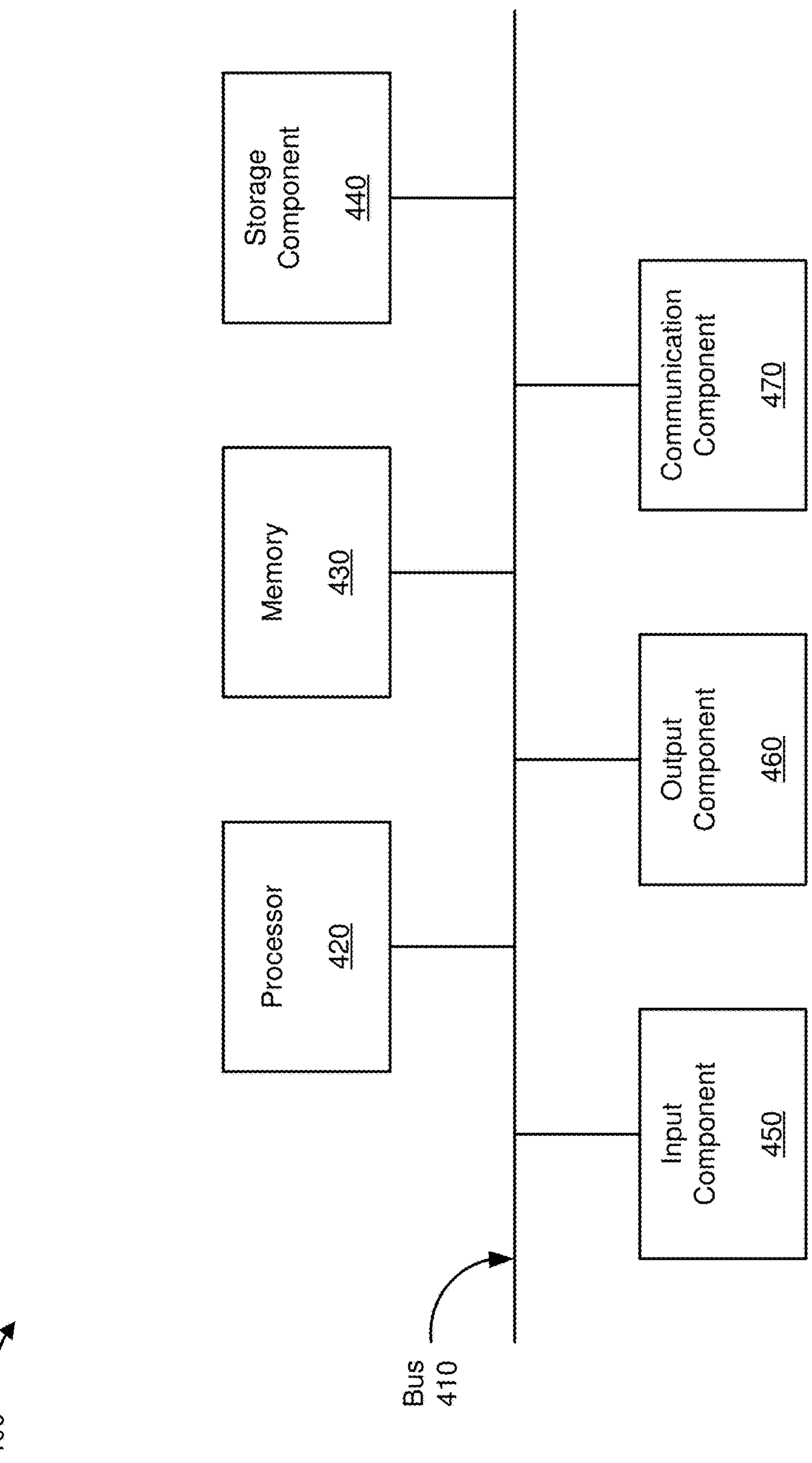
FIG. 4 is a diagram of example components of one or more devices of FIGS. 1 and 2.

FIG. 4 is a diagram of example components of a device 400, which may correspond to the computing device 102 or the computer 201, among other examples. In some implementations, the computing device 102 or the computer 201 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, and/or an actuator. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, and/or an antenna.

Device 400 may perform one or more processes described herein. For example, a non-transitory computer-readable medium (e.g., memory 430 and/or storage component 440) may be a repository that stores a set of instructions (e.g., one or more instructions, code, software code, and/or program code) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
FIG. 5 is a flowchart of an example process associated with determining log templates for log templatization.
Figure 5:
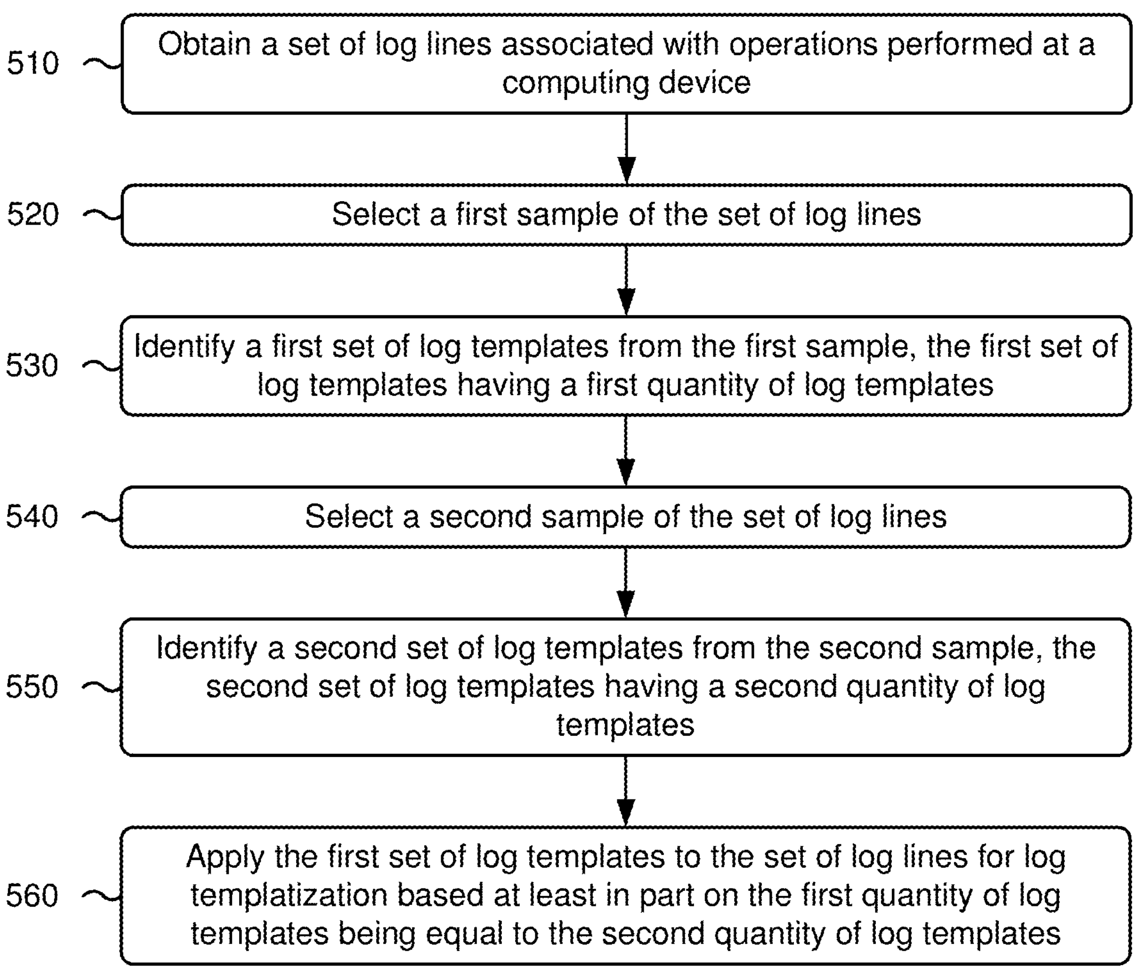

FIG. 5 is a flowchart of an example process 500 associated with log templatization as described herein. In some implementations, one or more process blocks of FIG. 5 may be performed by a computing device (e.g., computing device 102, 202, 204, 208, or computer 201). Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include obtaining a set of log lines associated with operations performed at a computing device (block 510). For example, the computing device may obtain a set of log lines associated with operations performed at a computing device, as described above.

As further shown in FIG. 5, process 500 may include selecting a first sample of the set of log lines (block 520). For example, the computing device may select a first sample of the set of log lines, as described above.

As further shown in FIG. 5, process 500 may include identifying a first set of log templates from the first sample, the first set of log templates having a first quantity of log templates (block 530). For example, the computing device may identify a first set of log templates from the first sample, the first set of log templates having a first quantity of log templates, as described above.

As further shown in FIG. 5, process 500 may include selecting a second sample of the set of log lines (block 540). For example, the computing device may select a second sample of the set of log lines, as described above.

As further shown in FIG. 5, process 500 may include identifying a second set of log templates from the second sample, the second set of log templates having a second quantity of log templates (block 550). For example, the computing device may identify a second set of log templates from the second sample, the second set of log templates having a second quantity of log templates, as described above.

As further shown in FIG. 5, process 500 may include applying the first set of log templates to the set of log lines for log templatization based at least in part on the first quantity of log templates being equal to the second quantity of log templates (block 560). For example, the computing device may apply the first set of log templates to the set of log lines for log templatization based at least in part on the first quantity of log templates being equal to the second quantity of log templates, as described above.

Process 500 may include additional implementations, such as any single implementation or any combination of implementations described below and/or in connection with one or more other processes described elsewhere herein.

In a first implementation, process 500 includes providing the first set of log templates to an additional computing device for use in log templatization.

In a second implementation, alone or in combination with the first implementation, process 500 includes receiving a third set of log templates from an additional computing device, identifying one or more log templates within the third set of log templates that are not in the first set of log templates, and adding the one or more log templates to the first set of log templates for log templatization at the computing device.

In a third implementation, alone or in combination with one or more of the first and second implementations, the second sample has a larger quantity of log lines than the first sample, or wherein the second sample has a different set of log lines than the first sample.

In a fourth implementation, alone or in combination with one or more of the first through third implementations, process 500 includes identifying, before identifying the second set of log templates, a third set of log templates from a third sample of the set of log lines, the third set of log templates having a third quantity of log templates, wherein selecting the second sample and identifying the second set of log templates is based at least in part on the third quantity of log templates being less than the first quantity of log templates.

In a fifth implementation, alone or in combination with one or more of the first through fourth implementations, the first sample has a quantity of log lines that is greater than a quantity of the third sample.

In a sixth implementation, alone or in combination with one or more of the first through fifth implementations, the second sample has a quantity of log lines that is greater than a quantity of the first sample, and wherein a first difference in the quantities of the first sample and the second sample is equal to a second difference in the quantities of the first sample and the third sample.

In a seventh implementation, alone or in combination with one or more of the first through sixth implementations, process 500 includes applying a clustering algorithm to identify matching components of log lines within the first sample.

In an eighth implementation, alone or in combination with one or more of the first through seventh implementations, a template of the first set of log templates comprises one or more variable fields that are different among log lines clustered into a template, and one or more fixed fields that are common among the log lines clustered into the template.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A computer-implemented method comprising:

obtaining a set of log lines associated with operations performed at a computing device;

selecting a first sample of the set of log lines;

identifying a first set of log templates from the first sample, the first set of log templates having a first quantity of log templates;

selecting a second sample of the set of log lines;

identifying a second set of log templates from the second sample, the second set of log templates having a second quantity of log templates;

determining that the first quantity of log templates is equal to the second quantity of log templates;

determining that the first sample of the set of log lines is sufficient to use for log templatization;

conserving computing resources by applying the first set of log templates to the set of log lines for log templatization based at least in part on the first quantity of log templates being equal to the second quantity of log templates; and performing anomaly detection on the computing device using the set of log lines after applying the first set of log templates.

2. The computer-implemented method of claim 1, further comprising:

providing the first set of log templates to an additional computing device for use in log templatization.

3. The computer-implemented method of claim 1, further comprising:

receiving a third set of log templates from an additional computing device;

identifying one or more log templates within the third set of log templates that are not in the first set of log templates; and adding the one or more log templates to the first set of log templates for log templatization at the computing device.

4. The computer-implemented method of claim 1, wherein the second sample has a larger quantity of log lines than the first sample, or wherein the second sample has a different set of log lines than the first sample.

5. The computer-implemented method of claim 1, further comprising identifying, before identifying the second set of log templates, a third set of log templates from a third sample of the set of log lines, the third set of log templates having a third quantity of log templates, wherein selecting the second sample and identifying the second set of log templates is based at least in part on the third quantity of log templates being less than the first quantity of log templates.

6. The computer-implemented method of claim 5, wherein the first sample has a quantity of log lines that is greater than a quantity of the third sample.

7. The computer-implemented method of claim 6, wherein the second sample has a quantity of log lines that is greater than a quantity of the first sample, and wherein a first difference in the quantities of the first sample and the second sample is equal to a second difference in the quantities of the first sample and the third sample.

8. The computer-implemented method of claim 1, wherein identifying the first set of log templates comprises:

applying a clustering algorithm to identify matching components of log lines within the first sample.

9. The computer-implemented method of claim 8, wherein a template of the first set of log templates comprises:

one or more variable fields that are different among log lines clustered into a template, and one or more fixed fields that are common among the log lines clustered into the template.

10. A computer program product comprising:

one or more non-transitory computer readable storage media, and program instructions collectively stored on the one or more non-transitory computer readable storage media, the program instructions comprising:

program instructions to obtain a set of log lines associated with operations performed at a computing device;

program instructions to select a first sample of the set of log lines;

program instructions to identify a first set of log templates from the first sample, the first set of log templates having a first quantity of log templates;

program instructions to select a second sample of the set of log lines that is larger than the first sample;

program instructions to identify a second set of log templates from the second sample, the second set of log templates having a second quantity of log templates;

program instructions to determine that the first quantity of log templates is equal to the second quantity of log templates;

program instructions to determine that the first sample of the set of log lines is sufficient to use for log templatization; and program instructions to conserve computing resources by applying the first set of log templates to the set of log lines for log templatization based at least in part on the first quantity of log templates being equal to the second quantity of log templates; and program instructions to perform anomaly detection on the computing device using the set of log lines after applying the first set of log templates.

11. The computer program product of claim 10, wherein the program instructions comprise:

program instructions to provide the first set of log templates to an additional computing device for use in log templatization.

12. The computer program product of claim 10, wherein the program instructions comprise:

program instructions to receive a third set of log templates from an additional computing device;

program instructions to identify one or more log templates within the third set of log templates that are not in the first set of log templates; and program instructions to add the one or more log templates to the first set of log templates for log templatization at the computing device.

13. The computer program product of claim 10, wherein the second sample has a different set of log lines than the first sample.

14. The computer program product of claim 10, wherein the program instructions comprise:

program instructions to identify, before identifying the second set of log templates, a third set of log templates from a third sample of the set of log lines, the third set of log templates having a third quantity of log templates wherein the second sample has a different set of log lines than the first sample, wherein selecting the second sample and identifying the second set of log templates is based at least in part on the third quantity of log templates being less than the first quantity of log templates.

15. The computer program product of claim 14, wherein the first sample has a quantity of log lines that is greater than a quantity of the third sample.

16. The computer program product of claim 15, wherein a first difference in the quantities of the first sample and the second sample is equal to a second difference in the quantities of the first sample and the third sample.

17. The computer program product of claim 10, wherein, to identify the first set of log templates, the program instructions comprise:

program instructions to apply a clustering algorithm to identify matching components of log lines within the first sample.

18. The computer program product of claim 17, wherein a template of the first set of log templates comprises:

one or more variable fields that are different among log lines clustered into a template, and one or more fixed fields that are common among the log lines clustered into the template.

19. A system comprising:

one or more first computing devices configured to:

obtain a set of log lines associated with operations performed at a second computing device;

select a first sample of the set of log lines;

identify a first set of log templates from the first sample, the first set of log templates having a first quantity of log templates;

select a second sample of the set of log lines that is larger than the first sample;

identify a second set of log templates from the second sample, the second set of log templates having a second quantity of log templates that is greater than the first quantity of log templates;

select a third sample of the set of log lines that is larger than the second sample;

identify a third set of log templates from the third sample, the third set of log templates having a third quantity of log templates that is equal to the second quantity of log templates;

determine that the second quantity of log templates is equal to the third quantity of log templates;

determine that the second sample of the set of log lines is sufficient to use for log templatization based on the second quantity of log templates being equal to the third quantity of log templates;

conserving computing resources by applying the second set of log templates to the set of log lines for log templatization based at least in part on the second quantity of log templates being equal to the third quantity of log templates; and performing anomaly detection on the second computing device using the set of log lines after applying the second set of log templates.

20. The system of claim 19, wherein application of the second set of log templates is further based at least in part on the second set of log lines matching the third set of log lines.

* * * * *